United States Patent
Kyrtsos

Patent Number: 5,651,431
Date of Patent: Jul. 29, 1997

[54] METHOD OF BRAKE LINING WEAR DETECTION USING TEMPERATURE SENSING

[75] Inventor: Christos T. Kyrtsos, Southfield, Mich.

[73] Assignee: Eaton Corporation, Cleveland, Ohio

[21] Appl. No.: 592,278

[22] Filed: Jan. 26, 1996

[51] Int. Cl.[6] ........................... F16D 66/00
[52] U.S. Cl. ............. 188/1.11 L; 374/141; 303/20
[58] Field of Search ................ 188/1.11 WE, 188/79.52, 1.11 W, 1.11 E, 1.11 R; 340/454, 453; 116/208; 73/121, 129, 130; 192/30 W; 374/179, 141; 303/20

[56] References Cited

U.S. PATENT DOCUMENTS

| | | |
|---|---|---|
| 1,957,051 | 5/1934 | Norton . |
| 2,494,269 | 1/1950 | Sparkes . |
| 3,674,114 | 7/1972 | Howard .................. 188/1.11 WE |
| 3,825,891 | 7/1974 | Kinast . |
| 3,975,706 | 8/1976 | Kato ...................... 188/1.11 WE |
| 4,020,454 | 4/1977 | Malonee ................. 188/1.11 WE |
| 4,204,190 | 5/1980 | Wiley et al. . |
| 4,520,661 | 6/1985 | Tamai et al. . |
| 4,646,001 | 2/1987 | Baldwin et al. . |
| 4,658,936 | 4/1987 | Moseley ................. 188/1.11 |
| 4,674,326 | 6/1987 | Reinecke ................ 188/1.11 |
| 4,790,606 | 12/1988 | Reinecke ............... 188/1.11 |
| 4,824,260 | 4/1989 | Novotny et al. ........ 374/179 |
| 4,971,179 | 11/1990 | Gebhardt et al. ....... 303/20 |
| 5,079,947 | 1/1992 | Feldmann et al. ...... 188/1.11 WE |
| 5,372,221 | 12/1994 | Jalbert .................. 188/1.11 |
| 5,419,415 | 5/1995 | Lamb et al. . |

Primary Examiner—Douglas C. Butler
Attorney, Agent, or Firm—Loren H. Uthoff, Jr.; Howard D. Gordon

[57] ABSTRACT

A method for detection of wear of a brake lining using a temperature sensor embedded in a brake lining adjacent to a brake table. A temperature versus time history recorded upon application of the brake system is transmitted to a microprocessor based processing unit which estimates the thickness of the remaining brake lining based on comparison with calibration data stored in the processing unit.

10 Claims, 3 Drawing Sheets

METHOD OF BRAKE LINING WEAR DETECTION USING TEMPERATURE SENSING

BACKGROUND OF THE INVENTION

1. Field of the Invention

The present invention relates to a method of brake lining wear sensing. More specifically, the present invention relates to a method of brake wear sensing based on a temperature versus time history at the lining/shoe interface after application of the brake.

2. Description of the Prior Art

Various brake lining wear detection systems are known in the art. In addition, temperature measurement systems are known, although very few methods are known which combine the capability of detecting brake wear along with detecting the operating temperature of the brake lining. U.S. Pat. No. 5,419,415, the disclosure of which is incorporated herein by reference, discloses an apparatus for monitoring the operating temperature and providing a signal when an elevator brake lining reaches a service wear point. An electrically conductive wire loop and a temperature sensitive resistor are disposed within the brake lining. Monitoring the resistance of the temperature sensitive resistor yields a signal which represents the operating temperature of the brake lining so that extreme temperature conditions can be detected and corrective action taken. Once the electrical conductive loop is worn away, an open circuit is detected which signals the need for lining replacement.

U.S. Pat. No. 4,204,190, the disclosure which is hereby incorporated by reference, describes a brake lining wear detection system where a signal is generated when an embedded conductive wire loop is broken and when electrical contact is made between the wire loop and a brake drum surface thereby indicating the lining wear out point. Likewise, U.S. Pat. No. 3,825,891, the disclosure which is hereby incorporated by reference, describes a brake lining wear sensing system where an electrical circuit signals when an embedded wire loop is broken due to wear of the lining and/or when the wire loop contacts the brake drum. In addition, U.S. Pat. No. 2,494,269, the disclosure which is hereby incorporated by reference, discloses a brake wear and temperature measurement system where a plurality of thermo-responsive elements are disposed within the brake lining where each element is selectively monitored to determine if abnormal temperatures have been encountered and/ or whether the brake lining has worn to such an extent that one or more of the thermally responsive elements have been broken.

U.S. Pat. No. 4,646,001, the disclosure of which is incorporated herein by reference, discloses a resistive array connected to a plurality of conductive strips that are embedded within the brake lining. Each wire is located at a selective height of the brake lining and as each conductive strip is broken due to wear of the brake lining, resistive elements are added to the detection circuit, the brake lining wears, the overall resistance of the resistive array increases. The resistive elements themselves are positioned outside of the brake lining to prevent damage and drift due to temperature changes. No temperature sensing capability is included in this particular system.

A more traditional brake temperature indication means is disclosed in U.S. Pat. No. 1,957,051 where a thermocouple is disposed within the brake lining connected to a display means to indicate operating temperature of the brake lining. A similar technique is used in U.S. Pat. No. 4,520,661 where a combination temperature and wear sensor is disposed in a brake cylinder where the sensor has a slider mechanism that is pressed on the face of a brake cylinder to indicate brake wear and also includes a temperature sensing device thereby indicating the wear of the brake lining and overheating of the brake fluid through a pair of lead out wires.

What is needed in the market is a compact, inexpensive and reliable method of measuring brake wear and monitoring brake temperature using one sensor and a processing unit.

SUMMARY OF THE INVENTION

The present invention provides a method of estimating the thickness of the brake lining based on the time and temperature history of the brake lining after activation of the brake system. A temperature sensing device such as a thermocouple or thermistor is embedded in the brake lining preferably near the brake table having an electrical output connected to a processing unit. Upon application of the vehicle brake, the processing unit monitors the output of the temperature sensor to document a temperature versus time history and then uses this information to calculate a brake lining thickness based on several averaged brake applications. The temperature versus time information is averaged over a number of samples to produce a temperature history which is compared to a calibration temperature curve to establish a brake lining thickness. Also, if the operating maximum temperature exceeds a predetermined limit, the operator is signaled alerting of a possible immediate brake service requirement.

One provision of the present invention is to provide a method of determining the thickness of a brake lining based on the time and temperature history of the lining.

Another provision of the present invention is to provide a method of determining the thickness of a brake lining based on the time and temperature history of the lining during vehicle braking.

Another provision of the present invention is to provide a method of determining the thickness of a brake lining using a temperature sensitive transducer embedded in the brake lining.

Still another provision of the present invention is to provide a method of determining the thickness of a brake lining using an average number of brake lining temperature and time history records established at the time of vehicle braking.

The invention possesses other objects, provisions and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

DETAILED DESCRIPTION OF THE PREFERRED EMBODIMENT

Figure 1:
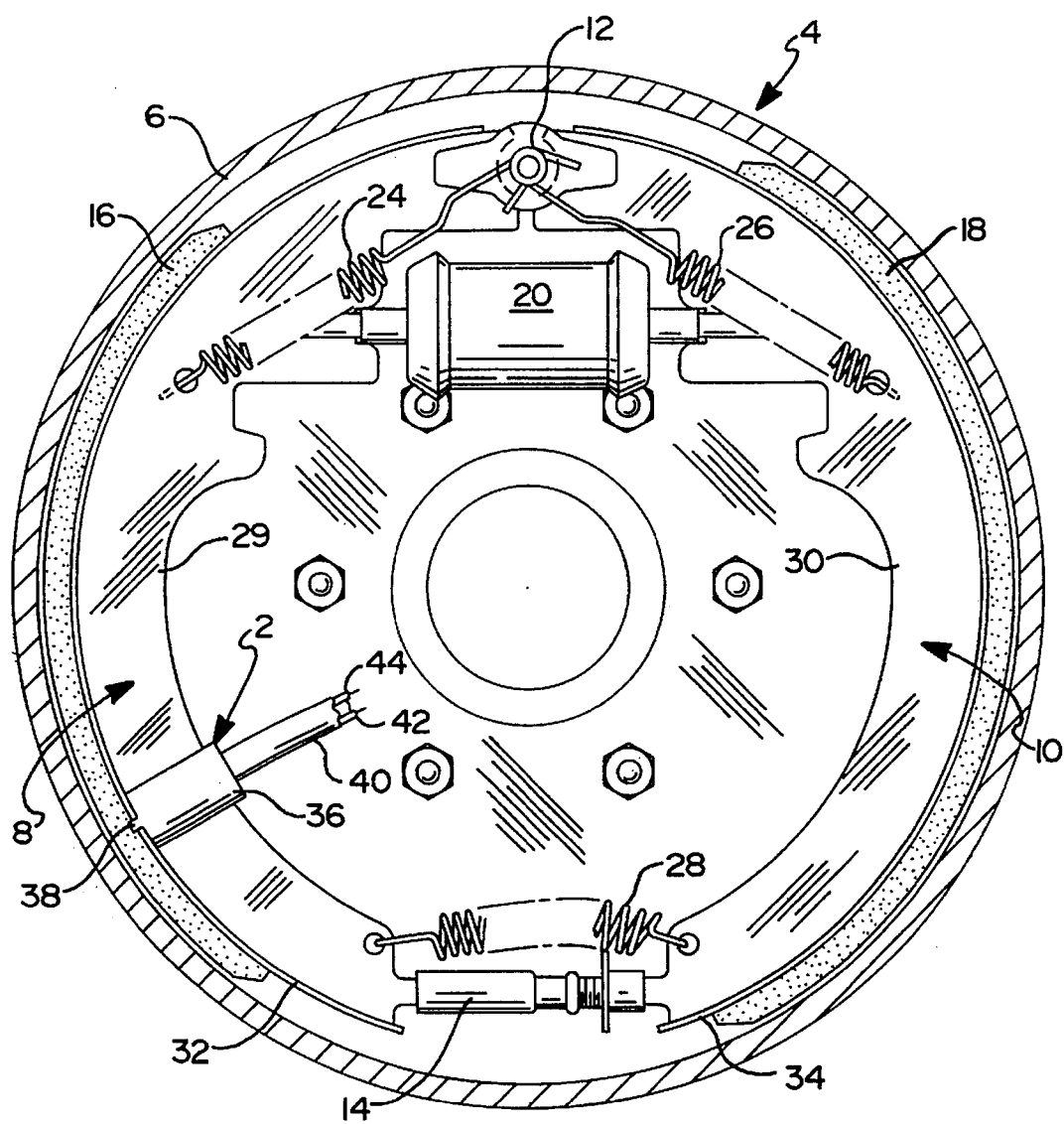
FIG. 1 is a partial cross-sectional view of the present invention showing a temperature sensor embedded in a brake lining.

For purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Now referring to FIG. 1 of the drawings, a partial cross-sectional view of the brake lining wear and temperature sensing system of the present invention is shown where a temperature sensor 2 is shown mounted on a brake assembly 4. The brake assembly 4 includes a brake drum 6 and brake shoes 8 and 10 engaging an anchor pin 12 at their upper ends. A conventional lining wear adjustment mechanism 14 connects the lower ends of the brake shoes 8 and 10 and a wheel cylinder 20 is provided to actuate the brakes shoes 8 and 10 into engagement with the drum 6 when it is desired to retard the movement of a vehicle. The brake shoes 8 and 10 have brake linings 16 and 18 respectively, secured thereto and are biased to a retracted position by return springs 24 and 26 respectively, while retainer spring 28 is provided to maintain the lower ends of brake shoes 8 and 10 into engagement with adjustment mechanism 14. The brake linings 8 and 10 are bonded to brake tables 32 and 34 respectively while the brake tables 32 and 34 are mounted on brake webs 29 and 30 respectively. It is specifically understood than any known type of brake mechanism could be utilized including but not limited to vehicle S-cam brakes and vehicle disc brakes.

The brake temperature sensor 2 of the present invention is mounted to the brake table 32 of brake shoe 8 and a similar sensor could be mounted to the brake table 34 of brake shoe 10. The brake temperature sensor 2 consists of a sensor main body 36, a sensing head 38 and a connector 40. The main body 36 is mounted to the brake table 34 and supports the temperature sensor 38 where the sensing head 38 extends into the brake lining 16 and is secured using an epoxy, ceramic or other type of suitable cement to bond the sensing head into the brake lining 16 while allowing the sensing head 38 to wear away with the brake lining 16. The connector 40 consists of two electrical leads 42 and 44 which serve to electrically connect the sensing head 38 to a processing unit 56 (see FIG. 2).

A temperature sensing means is embedded in the sensing head 38 which can be any type of temperature sensitive transducer. For example, temperature sensing means can be a thermocouple or a thermistor (see FIG. 2) or any other type of suitable temperature sensing device, such as a fiberoptic temperature sensor which generates an electrical signal. The sensing head 38 is located in relatively close proximity to the brake table 8 which is mounted on the brake web 10. It is contemplated that other types of braking devices and structures such as disc brakes or industrial brakes could be similarly fitted with the present invention in order to estimate the remaining thickness of a friction material upon application of the brake.

Figure 2:
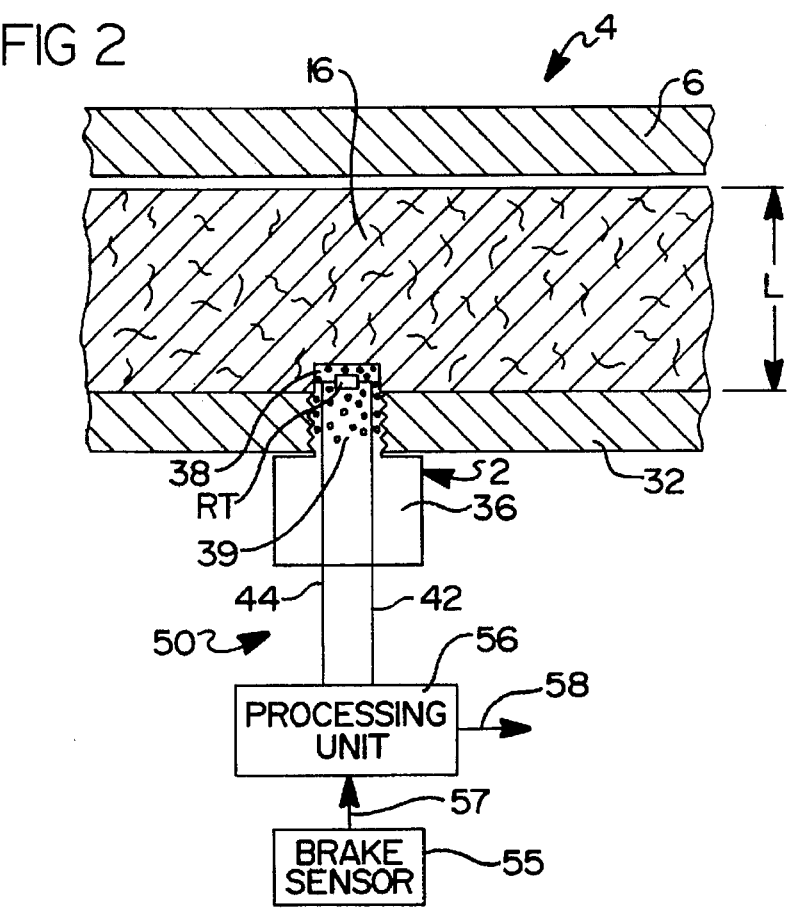
FIG. 2 is a partial cross-sectional view of the present invention showing a thermistor embedded in a brake lining and connected to a processing unit.

Now referring to FIG. 2 which shows a partial cross-sectional view of a brake and the brake wear detection system 50 of the present invention. The output leads 42 and 44 of the temperature sensor 2 are connected to a processing unit 56 which preferably is a combination of a microprocessor and interfacing electronics and a power supply to accept and process signals from the temperature sensor 2 and braking assembly 4 to which the present brake wear detection system 50 is applied. One required signal from the braking system is one which represents when the brake is applied. This signal is generated by brake sensor 55 and is supplied to the processing unit 56 on line 57. The specific structure of such a brake sensor 55 is not shown but any suitable signaling device could be used such as a pressure switch connected to the brake pressure supply line (not shown). The signal from brake sensor 55 is sent to the processing unit 56 and tells the processing unit 56 when to begin acquiring temperature data from the temperature sensor 2, or if no brake sensor is available, the processing unit can begin acquiring the temperature data when the temperature increases substantially due to the brakes being applied.

The partial cross-sectional view of the brake assembly 4 includes a section of the brake drum 6 which frictionally interacts with the brake lining 16 having a thickness L. The brake lining 16 is bonded to the brake table 32. A small cavity is formed in the brake lining 16 to accept the insertion of a thermistor RT which is secured in the cavity using potting material 39 which can be a ceramic or other material with good high temperature bonding properties. An alternate method of securing the thermistor RT in the brake lining 16 would be to screw it into the lining 16. The sensor main body 36 is secured to the brake table 32 and electrical leads 42 and 44 are supported in the main body 36 and serve to electrically connect the thermistor RT to the processing unit 56. The processing unit 56 reads the output of the thermistor RT over lines 42 and 44 when the brake assembly 4 is applied. A signal is sent from brake sensor 55 on line 57 to the processing unit 56 when the brake assembly 4 is energized. When the brake signal is received on line 57, the processing unit 56 begins to record the output of the thermistor RT from lines 42 and 44 and creates a history of brake lining temperature versus time or dynamically computes the shape of temperature versus time. As discussed below, an estimation of the brake lining thickness L is made and the information is transmitted on line 58 for communication to a display and/or warning device (not shown).

Figure 3:
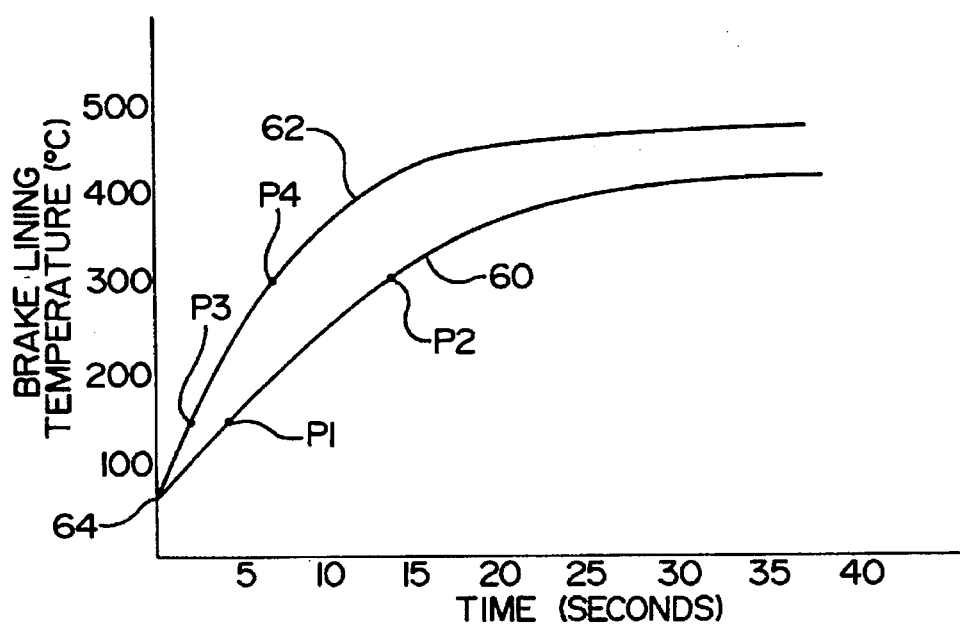
FIG. 3 is a graph showing a typical brake lining temperature and time history for both a thick and thin brake lining.

Now referring to FIG. 3, temperature curve 60 is a graph of brake lining 16 temperature versus time for a thick lining thickness L and curve 62 is a brake lining 16 temperature versus time for a relatively thin lining thickness $L^2$. Temperature curve 60 is a graphical representation of brake lining temperature at the temperature sensing head 38 (thermistor RT) versus elapsed time for a relatively thick brake lining thickness $L^1$ where the rate of temperature rise is relatively slow due to the time for heat to flow through the brake lining 16 to reach the temperature sensor 2 at sensing head 38. The temperature curve 60 is shown starting at the initiation of brake application at an ambient temperature of approximately 60° C. at point PA and increasing to 86% of its final equilibrium value (two time constants) in approximately twenty seconds. Also, the brake lining temperature shown by temperature curve 60 increases to 5.8 times its initial value after approximately twenty seconds. As a point of reference, after 10 seconds the brake lining temperature has increased to approximately 240° C. or 4.0 times its initial value.

Temperature curve 62 is a graphical representation of brake lining 16 temperature at the temperature sensing head 38 (thermistor RT) versus elapsed time for a relatively thin brake lining thickness $L^2$. The temperature curve 62 starts at the initiation of brake application at an ambient temperature of approximately 60° C. shown as point 64 and increases to 86% of its final equilibrium value (two time constants) in approximately 12 seconds. Also, the brake lining temperature increases to 7.0 times its initial value after approximately 12 seconds. As a point of reference, after 10 seconds the brake lining temperature has increased to approximately 375° C. or 6.25 times its initial value.

Thus, using previously known temperature versus time relationships for various brake lining thickness L of the brake lining, the time for the brake lining 16 temperature to increase to a given amount above its initial value upon application of the brake can be used to estimate the lining thickness L. To improve the accuracy of the estimate, the temperature of the brake lining 16 can be averaged over several brake applications and a running average temperature can be used to estimate the brake lining thickness L and thus, indicate when service is required.

The following chart gives some example values for the time to reach a brake lining 16 temperature of 300° C. from an initial value of 150° C. for various values of lining thickness L upon a nominal brake application (assumed to be 50% of the maximum braking capacity).

| Lining Thickness (mm) | (150° C.–300° C.) Rise Time (sec) |
| --- | --- |
| 16 | 11.5 |
| 12 | 8.0 |
| 8 | 4.5 |
| 4 | 3.5 |

Calibration tables for various values of brake lining thickness L are stored in the processing unit 56 for comparison with the averaged operational temperature versus time history obtained upon each application of the brake when signaled by the brake sensor 55 on line 57. The operational values of time between two selected temperatures, and/or the rate of temperature rise and/or time to a percentage of the maximum allowable temperature can be used to estimate the lining thickness L based on the calibration tables stored in the processing unit 56. For example, the time for the temperature of the brake lining 16 to increase from 150° C. to 300° C. are shown as points P1 and P2 for the thick lining and as points P3 and P4 for the thin lining. The elapsed time to increase from 150° C. to 300° C. is 10 seconds for the thick lining and 5 seconds for the thin lining. Thus, if the measured time for an unknown brake lining thickness L to increase in temperature from 150° C. to 300° C. is 7 seconds, then the brake lining has adequate running life.

Proof of the validity of the estimation technique of using brake lining temperature to calculate lining thickness L can be expressed mathematically using a one dimensional heat transfer model as follows:

The heat flux at any point in the brake lining due to the heat generated by the application of the brakes can be represented by the relationship for x=L where q is the rate of heat transfer in joules/meter$^2$. Likewise, for x=o at the location where the thermistor is embedded in the lining, $$q = \frac{\lambda \partial T}{\partial x}\bigg|_{x=L, t=o} \text{ and } Tl=o= \frac{\partial T}{\partial x}\bigg|_{x=o}$$

It is hypothesized that the heat flux q (watts/meter$^2$) to the lining surface decreases according to the relationship $q=q_o(1-t/ts)$ where qo equals the initial braking heat flux and ts equals the time of braking.

The general equation for heat conduction is:

$$\frac{\partial T}{\partial t} = a \frac{\partial^2 T}{\partial x^2} \quad (1)$$

The boundary conditions are:

$$\frac{\partial T}{\partial x}\bigg|_{x=o} = o \text{ and } \lambda \frac{\partial T}{\partial x}\bigg|_{x=L} = q$$

The initial condition is:

$$Tl(t=o)=o$$

Solving we obtain:

$$T = 2q_o \frac{\sqrt{at^{1/2}}}{\lambda} \sum_{n=o}^{\infty} \left\{ ierfc \frac{(2n+1)L-x}{2\sqrt{at}} + ierfc \frac{(2n+1)L+x}{2\sqrt{at}} \right\} - 8q_o \frac{\sqrt{at^{3/2}}}{\lambda} \sum_{n=o}^{\infty} \left\{ i^3 erfc \frac{(2n+1)L-x}{2\sqrt{at}} + i^3 erfc \frac{(2n+1)L+x}{2\sqrt{at}} \right\} \quad (2)$$

where $o<t \leq ts$ the first condition of $q=qo(1-t/ts)$ allows the replacement of $q_o$ with $q_o$ in equation (2) without affecting the accuracy of equation (2) where $q_o$ is the average heat flux experienced by the brake lining 4. Now, let $$\alpha = \frac{(2n+1)}{2\sqrt{at}} L \text{ and } \beta = \frac{1}{2\sqrt{at}}$$

Such that, assuming the temperature sensor, which is thermocouple 6, is embedded at x=o, the substituting into equation (2) and simplifying yields:

$$T(o,t) = \frac{2q_o}{\lambda \beta} \left( \sum_{n=o}^{\infty} ierfc(\alpha) - 4t \sum_{n=o}^{\infty} i^3 erfc(\alpha) \right) \quad (3)$$

Now substituting $$ierfcx = \frac{1}{\sqrt{\pi}} e^{-x^2} - x erfcx$$

and $$i^3 erfcx = \frac{1}{6} \frac{(1+x^2)e^{-x^2}}{\sqrt{\pi}} - x \left( \frac{3}{2} + x^2 \right) erfcx$$

then $$T(x=o,t) = \frac{2q_o}{\lambda \beta} \sum_{n=o}^{\infty} \left\{ \frac{1}{\sqrt{\pi}} e^{-\alpha^2} \left[ 1 - \frac{2}{3} t(1+\alpha^2) + \alpha erfc\alpha \frac{2}{3} t \left( \frac{3}{2} + \alpha^2 \right) - 1 \right] \right\} \quad (4)$$

-continued for $\alpha < 1$, $$\frac{1}{\sqrt{\Pi}}(e^{-\alpha^2} - \alpha\,erfc\alpha) \approx 0.835 + 0.1839\alpha + \frac{1.4115}{(\alpha+1)}$$

and $R^2 = 0.999$ also $$2/3t\left[\alpha\,erfc\alpha(3/2+\alpha^2) - \frac{e^{-\alpha^2}}{\sqrt{\Pi}}(1+\alpha^2)\right] \approx$$

$$0.7140 - 0.185\alpha - \frac{1.076}{(\alpha+1)}$$

and $R^2 = 0.9942$

Now, combining the above with equation (4) yields:

$$T(x=o,t)\Big|_{\alpha<1} = \frac{2\bar{q}_o}{\lambda\beta}\sum_{n=o}^{m}\left\{-0.835 + 0.1839\alpha + \frac{1.4115}{(\alpha+1)} + t\left[0.7140 - 0.185\alpha - \frac{1.076}{(\alpha+1)}\right]\right\} \quad (5)$$

where m is dependent on $\propto$ and in order to determine m it is needed to find the largest m such that $$\frac{2(m+1)}{2\sqrt{at}}L < 1$$

where "a" is the diffusivity of the lining $$a = \frac{k}{\rho c}$$

For a typical application, the brake lining material has the following parameters:

$$k = 0.66\frac{w}{m°k}, \quad c = 0.20\frac{cal}{g°c}, \quad \rho = 1.93\ gm/cm^3$$

based on these values;

$$\alpha = 0.00408\frac{cm^3}{sec}$$

letting L=1.905 cm and t=30 minutes then $\frac{L}{2\sqrt{at}} = 0.35$ and $m = o$ Let $$\partial = \frac{4q_o\sqrt{a}}{\lambda}$$

assuming $$\delta = \frac{L}{2\sqrt{a}},$$

equation (5) now becomes:

$$T(x=o,t) = \quad (6)$$

$$\sqrt{t}\,\partial\left\{(0.1839 - 0.185t)\frac{\delta}{\sqrt{t}} + (1.4115 - 1.076t)\frac{1}{\left(1+\frac{\delta}{\sqrt{t}}\right)}\right\}$$

Solving (6) yields for $T(x=o,t_1)=T_1$ $$\partial = \frac{T_1}{\sqrt{t_1}\left\{(10.1834 - 0.185t_1)\frac{\delta}{\sqrt{t_1}} + \left(\frac{1.4115 - 1.076t_1}{\left(1+\frac{\delta}{\sqrt{t_1}}\right)}\right)\right\}} \quad (7)$$

Let
A=T (0.1839−0.185 $t_1$)
B=$T_1$(0.1839−0.185t)
C=$T_1\sqrt{t}$(1.4115−1.076t)
D=T$\sqrt{t}$(1.4115−1.076$t_1$)
then $$\delta(A-B) = \frac{C}{(1+\delta/\sqrt{t})} - \frac{D}{(1+\delta/\sqrt{t_1})} \quad (8)$$

Reorganizing equation (8) yields:

$$(A-B)\delta^3+\delta^2(A-B)(\sqrt{t_1}+\sqrt{t})+\delta[(A-B)\sqrt{tt_1}+(D\sqrt{t_1}-C\sqrt{t})]+ (D-C)\sqrt{tt_1}=o \quad (9)$$

Nomenclature:
q heat flux
T temperature
distance from friction surface
L lining thickness
$\lambda$ coefficient of thermal conductivity
$q_o$ heat flux initial value
a thermal diffusivity
c specific heat
time
R reliability of regression
$\rho$ density Thus, mathematically it can be proven that by measuring the temperature of the brake lining 16, as the brakes are applied, the thickness of the brake lining L can be approximated. It is assumed that the braking force is an average amplitude to provide a given frictional heat input and that the friction coefficient does not significantly change over the service life of the brake lining 16. Solving equation (9) yields the following results of temperature versus lining thickness L for the example brake lining 16 selected. Averaging the calculated lining thickness L over a number of brake applications tends to enhance the accuracy of the lining thickness L calculation.

Figure 4:
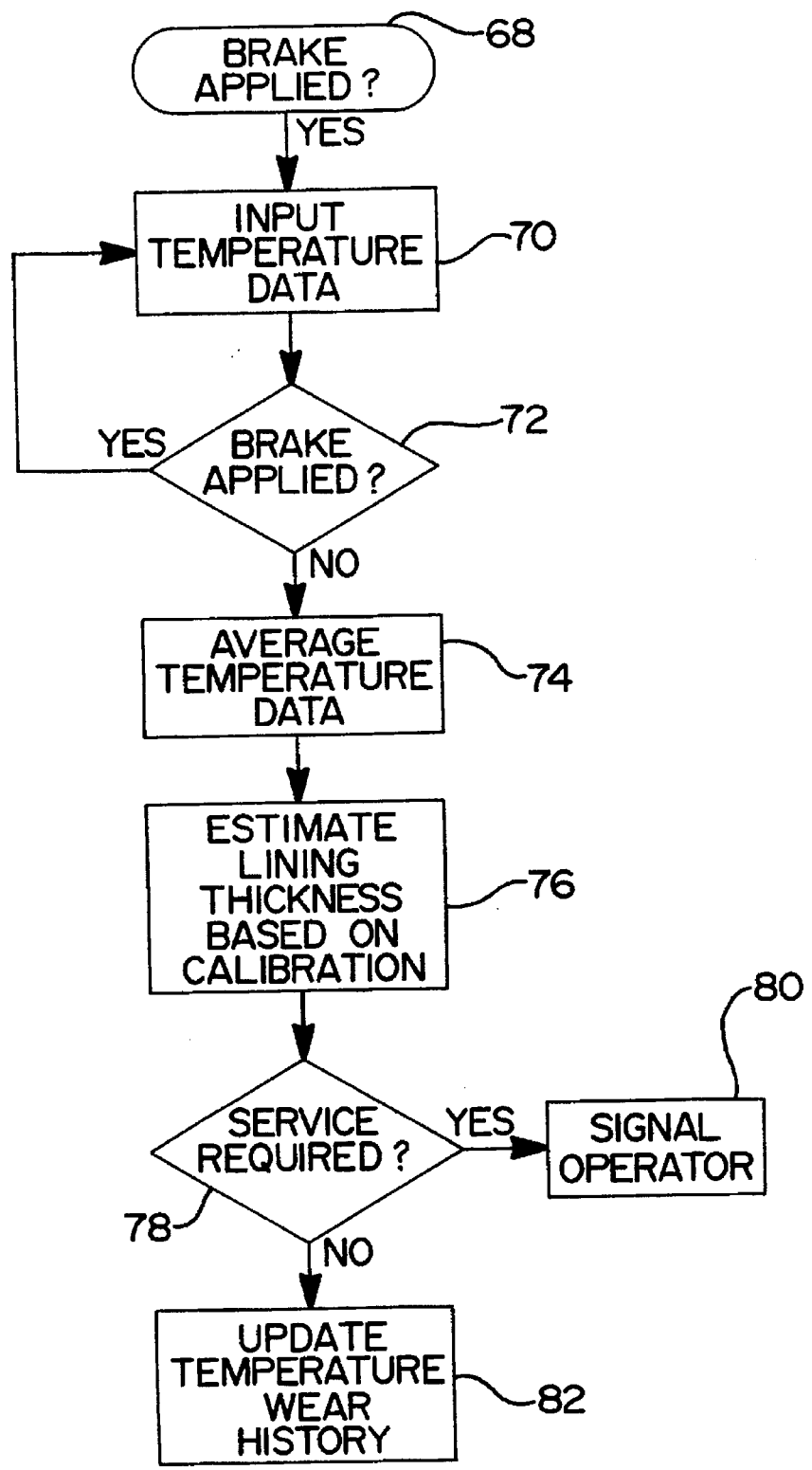
FIG. 4 is a flow chart of the present invention illustrating a method for calculating a lining thickness based on an averaged temperature versus time history for the brake lining.

A software flow chart is shown in FIG. 4 which illustrates the logic contained in the processing unit 56. A microprocessor contained within processing unit 56 would add intelligence and versatility to the brake wear detection system 50 in a way that would be difficult to achieve by discrete means such as through programmable logic devices. The processing unit 56 performs four general tasks in the operation of the brake wear detection system 50. (1) it inputs temperature data from the temperature sensor 2; (2) it calculates an average temperature history over a number of braking events; (3) it compares the averaged temperature and time history to calibration data to estimate a lining thickness L;

and (4) it determines if brake service is required either due to an over temperature or a wear-out condition. These functions are primarily originated by software driven inputs and outputs from a microprocessor. Each of these functions are expounded upon below.

The first task (1) begins upon application of the brake assembly 4 by action of the operator. The temperature data produced by the brake temperature sensor 2 (for example by the thermistor RT in FIG. 2) is inputted to the processing unit 56 and is recorded along with the time as long as the brake assembly 4 continues to be applied. The second task (2) is to average the most recently acquired temperature versus time data with that obtained during previous brake applications to provide improved accuracy due to variations in the brake application pressure for each braking event. In task (3) the thickness L of the brake lining is estimated based on the averaged operational temperature/time history and the calibration temperature/time curves or tables residing in the memory of the processing unit 56. Several options are available to compare the operational and the calibration temperature/time history of the brake lining 16 to establish the remaining thickness L. The time for the lining temperature to increase from a lower temperature to a higher temperature is one method of estimating the thickness L by comparing this time to calibration times stored in memory for each of several selected lining thicknesses L stored in the processing unit 56. Another method is to compare the time to reach a given percentage of the initial temperature as compared to calibration times for each of several selected thicknesses L stored in the processing unit 56. Still another method of estimating the thickness L of the brake lining 16 is to calculate the rate of temperature rise shortly after the application of the brake assembly 4 and compare that rate to a calibration value stored in the processing unit 56. The higher the rate of temperature increase in the lining 16, the thinner the thickness L.

The fourth (4) task of the processing unit 56 is to determine when the thickness L or operating temperature has reached a value at which service of the brake is required. This message is then transmitted to a driver display for action.

While the invention has been illustrated and described in some detail in the drawings and foregoing description, the same is to be considered as illustrative and not restrictive in character, it being understood that only the preferred embodiment has been shown and described and that all changes and modifications that come within the spirit of the invention are to be considered within the scope of the invention and only limited by the following claims.

I claim:

1. A method of brake lining wear detection based on a measured temperature of the brake lining upon application of a brake comprising:
    detecting application of said brake and generating an application signal;
    transmitting said application signal to a processing unit;
    measuring a brake lining temperature of said brake lining during transmission of said application signal;
    recording said lining temperature in said processing unit; and
    calculating a thickness of said brake lining based on said lining temperature within said processing unit according to the relationship: $L \propto t$ where L is said thickness of said brake and t is the time required for said lining temperature to increase from a given low temperature to a given high temperature upon application of said brake; and
    averaging said lining thickness over several braking applications.

2. The method of brake lining wear detection of claim 1, wherein said temperature of said brake lining is measured with a thermocouple.

3. The method of brake lining wear detection of claim 1, wherein said temperature of said brake lining is measured with a thermistor.

4. The method of brake wear detection of claim 1, wherein said temperature of said brake lining is measured with a temperature sensitive device positioned in said brake lining substantially adjacent to a brake table, said brake lining bonded to said brake table.

5. The method of brake wear detection of claim 1, further comprising averaging said lining temperature in said processing unit.

6. A method of brake lining wear detection based on a measured temperature of a brake lining upon application of a brake comprising:
    creating a set of calibration standards in a table contained within a processing unit based on a predetermined relationship between a thickness of said brake lining and a lining temperature and an application time;
    measuring said application time of said brake; measuring said lining temperature of said brake lining during said application time; and
    transmitting said lining temperature to said processing unit;
    estimating said lining thickness based upon said calibration standards and said lining temperature and said application time.

7. A method of brake lining wear detection based on a measured temperature of the brake lining upon application of a brake comprising:
    detecting application of a brake;
    measuring a lining temperature of said brake lining and an associated time period after said application of said brake;
    averaging said lining temperature with a prior lining temperature which occurred at an equivalent associated time period; and
    calculating a lining thickness based on said lining temperature and said time period according to the equation:

$$L \propto \frac{\Delta T}{\Delta t}$$

where L is said lining thickness and $\Delta T$ is the change in lining temperature over a time period $\Delta t$ measured during said application of said brake.

8. The method of brake lining wear detection of claim 7 wherein a temperature sensitive device is embedded within said brake lining to provide a measurement of said lining temperature.

9. The method of brake lining wear detection of claim 7 further comprising averaging the lining thickness over several brake applications.

10. A method of estimating the thickness of a brake lining comprising:
    storing a plurality of calibration curves in a processing unit, said calibration curves representing a relationship between a brake lining temperature and an elapsed application time for a given brake lining thickness;
    detecting application of a brake;
    measuring said brake lining temperature during said application of said brake;
    comparing said brake lining temperature during said application of said brake with said calibration curves; and
    estimating said brake lining thickness.

* * * * *